Aug. 19, 1958  C. GABRIELSEN  2,848,140
BEVERAGE MERCHANDISING MACHINE
Filed Feb. 26, 1953  3 Sheets-Sheet 1
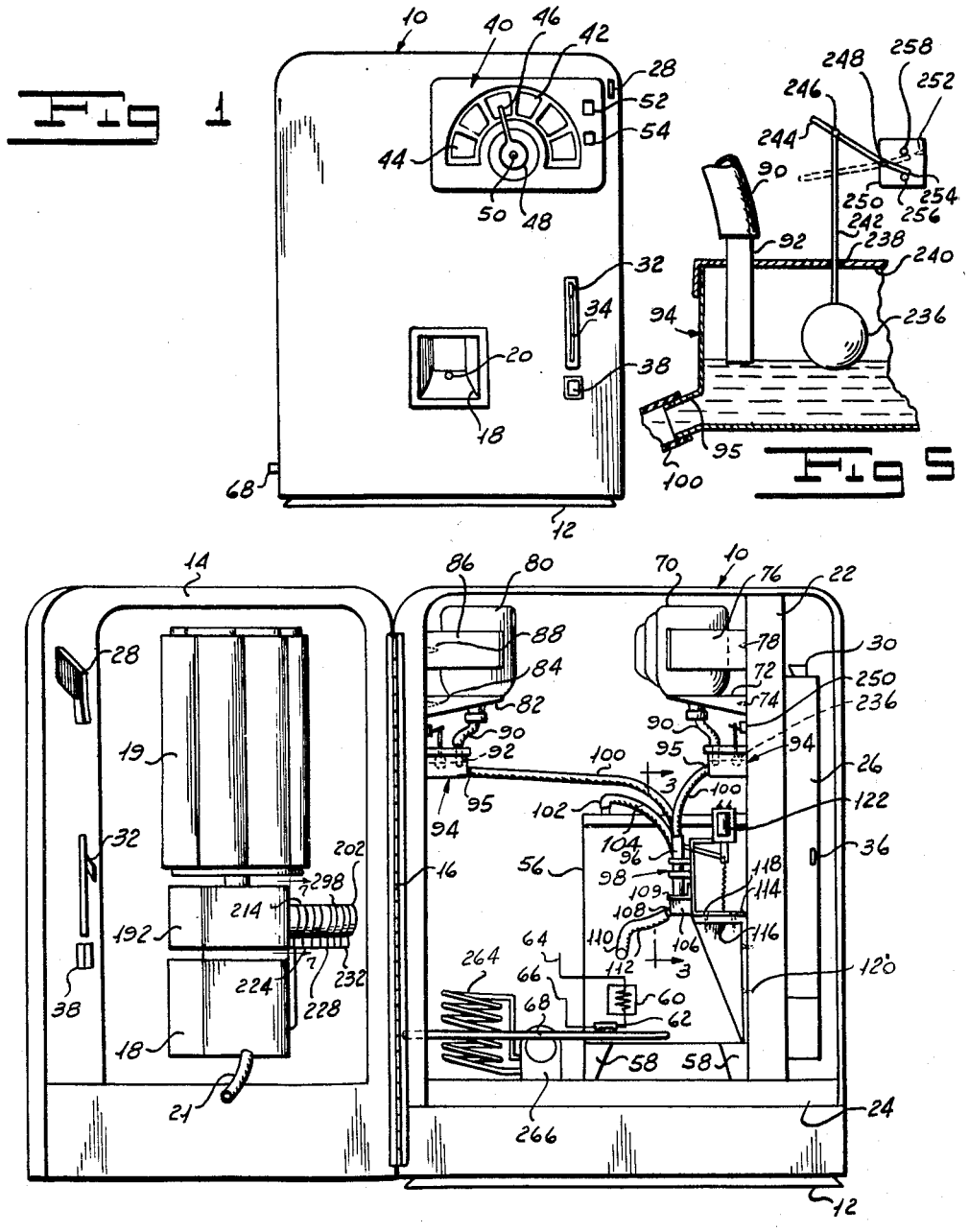
INVENTOR.
CHRISTIAN GABRIELSEN
BY
ATTORNEY

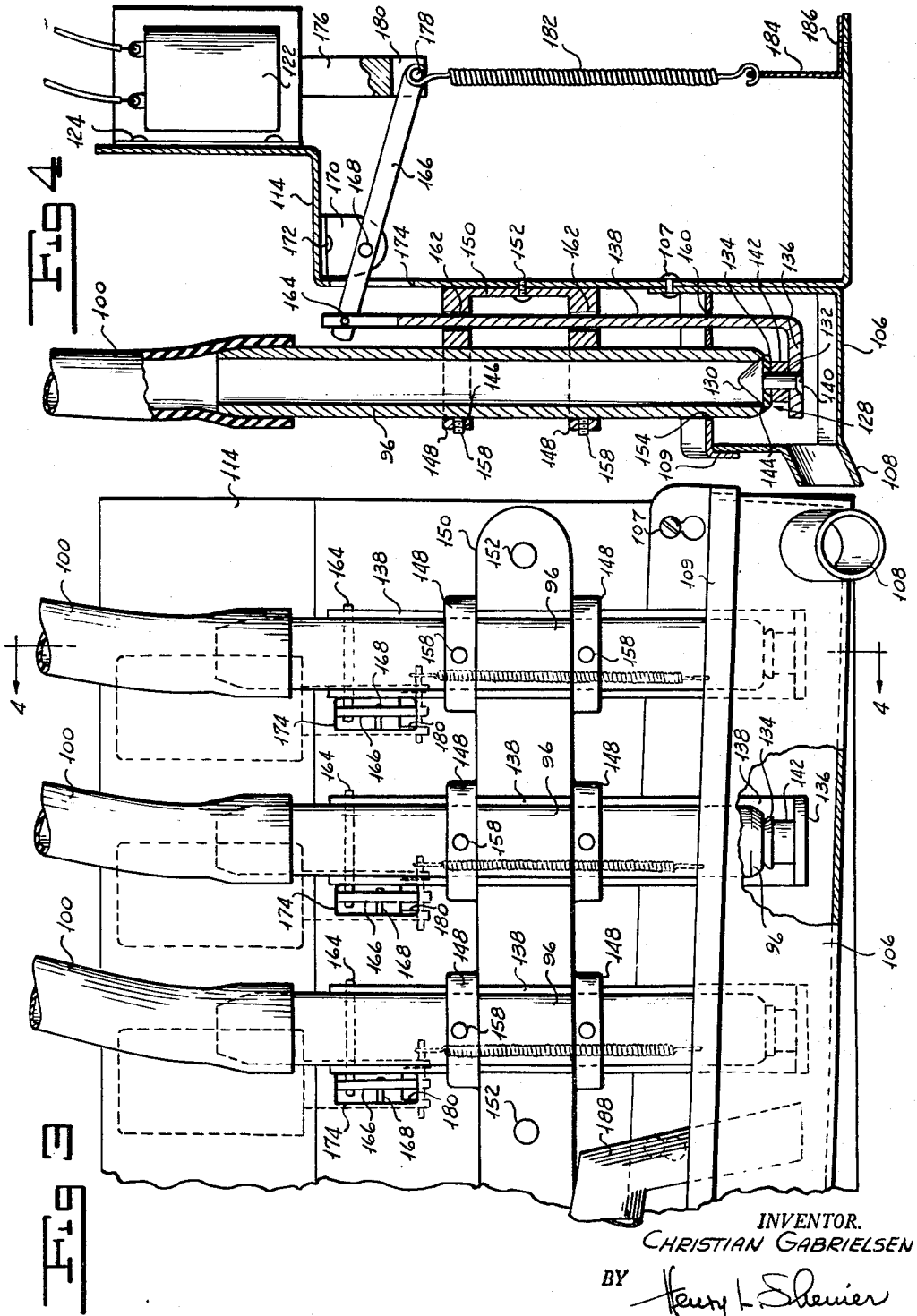

Aug. 19, 1958 C. GABRIELSEN 2,848,140
BEVERAGE MERCHANDISING MACHINE
Filed Feb. 26, 1953 3 Sheets-Sheet 3
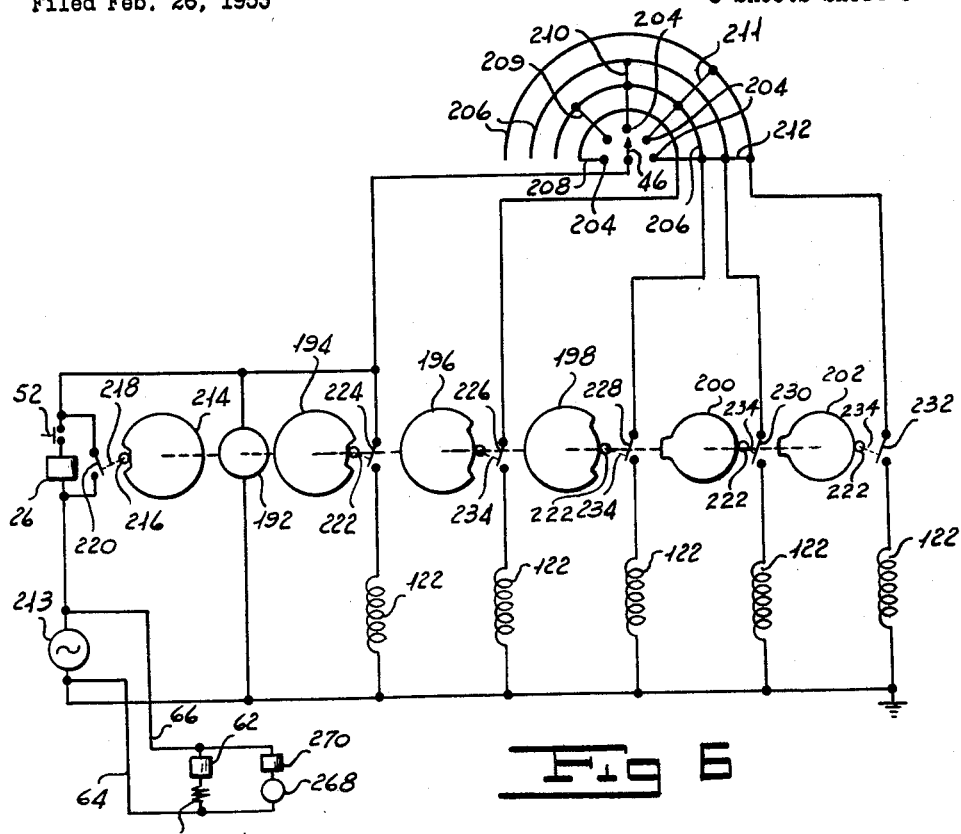
Fig 6
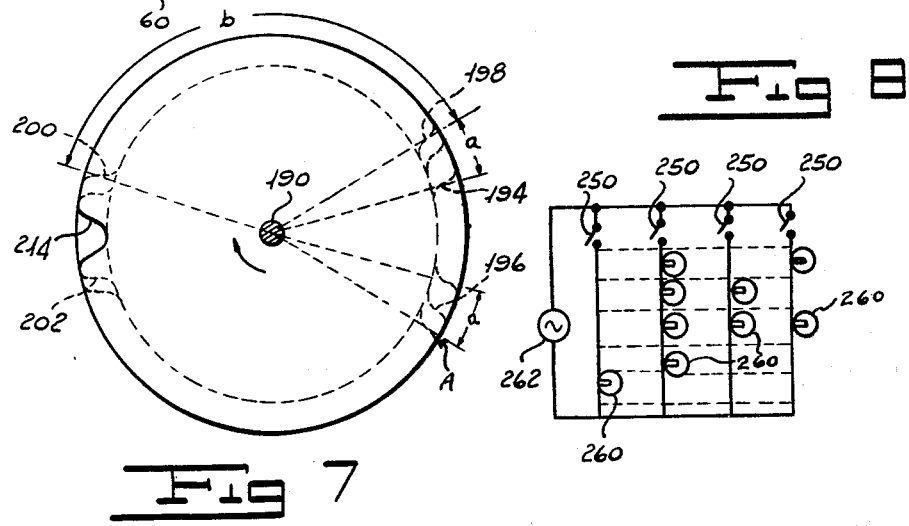
Fig 7
Fig 8
INVENTOR.
CHRISTIAN GABRIELSEN
BY
ATTORNEY

# United States Patent Office 2,848,140
Patented Aug. 19, 1958

2,848,140

BEVERAGE MERCHANDISING MACHINE

Christian Gabrielsen, Mountain Lakes, N. J., assignor to Rowe Manufacturing Co., Inc., Whippany, N. J., a corporation of New York Application February 26, 1953, Serial No. 339,026

5 Claims. (Cl. 222—51)

My invention relates to beverage merchandising machines and more particularly to an improved beverage merchandising machine and valve arrangement therefor for dispensing beverages which is more sanitary, simpler in construction, more economical to manufacture and more certain in operation.

In the beverage merchandising machines of the prior art in which liquids are mixed with water to make up the beverage to be dispensed, gummy deposits of liquid are left on parts of the liquid dispensing valves which are exposed to the air and in the channel or conduit in which the mixing takes place. When the deposits deteriorate, objectionable odors result and the unsanitary condition may cause food poisoning and attract vermin. The further problem exists of providing a beverage of constant controlled strength. Attempts have been made to ensure that only the proper amount of liquid is dispensed on each operation of any valve, but such attempts have been unsuccessful, largely because machines of the prior art provide inadequate or complicated means for controlling the head of liquid fed to each valve. Thus there is no assurance that the same amount of liquid will be released by the valve on each operation so that the beverage is consistent in strength. I have invented an improved valve arrangement for beverage merchandising machines employing stopper or plug type valves wherein the construction, arrangement and sequence of operation of the valves ensure that no gummy deposits of liquid are left in the mixing chamber or on the exposed parts of the valves. In addition, I have provided my machine with means ensuring a constant head of liquid in the supply to each valve so that the strength of the beverage is precisely controlled.

One object of my invention is to provide an improved beverage merchandising machine which is simpler in construction, more economical to manufacture and more certain in operation.

Another object of my invention is to provide an improved beverage merchandising machine wherein no gummy deposits are permitted to form on parts which are exposed to the air and to reduce the wetted areas exposed to air.

Another object of my invention is to provide an improved dispensing valve structure and supply therefor for a beverage merchandising machine in which the head of liquid fed to the dispensing valves is maintained constant.

Another object of my invention is to provide an improved beverage merchandising machine for dispensing a beverage wherein the strength of the beverage is accurately controlled.

Another object of my invention is to provide an improved beverage merchandising machine in which any number of hot and cold beverages may be selectively dispensed.

Another object of my invention is the provision of an improved beverage merchandising machine wherein means are provided to indicate that the supply of any particular beverage is exhausted.

Other and further objects of my invention will appear from the following description.

In the accompanying drawings which form part of the instant specification and which are to be read in conjunction therewith and in which like reference numerals are used to indicate like parts in the various views:

Figure 1 is a front view of my improved beverage merchandising machine.

Figure 2 is a front view of my improved beverage merchandising machine with the door open.

Figure 3 is a sectional view of part of my improved beverage merchandising machine with a part broken away, taken on an enlarged scale along the line 3—3 of Figure 2.

Figure 4 is a sectional view of a part of my improved beverage merchandising machine taken along the line 4—4 of Figure 3.

Figure 5 is a sectional view of one of the constant head reservoirs of my improved beverage merchandising machine on an enlarged scale.

Figure 6 is a schematic view of the electrical control circuits of my improved beverage merchandising machine.

Figure 7 is a sectional view on an enlarged scale of a part of my improved beverage merchandising machine taken along the line 7—7 of Figure 2 showing the control cam assembly.

Figure 8 is a schematic view of the empty signal system of my improved beverage merchandising machine.

In general my invention contemplates the provision of a housing having a hot water tank and a plurality of constant head liquid reservoirs therein, stopper or plug type valves associated with the tank and each of the liquid reservoirs, respectively, for supplying water and liquid to a mixing channel, means for sequentially opening the tank valve and selected ones of the liquid reservoir valves to obtain the mixture constituting the beverage to be dispensed, the sequence of actuation of the valves and the size of the mixing channel being such that no deposit of liquid is left in the mixing channel or on the exposed valve parts, and means for selecting the reservoir valves to be opened. The valve construction is such that the exposed areas are maintained at a minimum. In addition I provide my beverage merchandising machine with signal means for indicating when the machine is incapable of dispensing a particular beverage because one of the liquid reservoirs is empty.

More particularly, referring now to the drawings, I provide a housing, generally indicated by the reference numeral 10, mounted on a base 12 and having a front door 14 carried by a hinge 16 on one side of the housing. The door 14 is adapted to be swung open to the position shown in Figure 2. In the face of the door 14 I mount a cup-receiving chamber 18 having a hole 20 at its rear to which is attached a tube 21 for carrying off waste. A cup dispensing rack 19 is mounted on the inside of door 14, as shown in Figure 2. A portion of the interior of the housing 10 is partitioned off by a wall 22 extending from a platform 24 at the bottom of the housing to the top of the housing. The coin register 26 is mounted on one side of wall 22 by any suitable means. I provide a coin slot 28 which extends through the door 14 and deposits coins inserted therein in a part 30 on the top of coin register 26. A coin return lever 32 is mounted in a slot 34 in the face of door 14. The inwardly extending end of coin return lever 32 cooperates with a part 36 on the coin register to return the coins deposited in the coin slot 28 when the machine is empty or will not operate for any reason and lever 32 is depressed. The coins are returned through appropriate means (not shown) into a small chamber 38 in the face of door 14 below slot 34.

I also provide door 14 with a selecting panel, indicated generally by reference character 40. The panel includes a dial selector 42 having a number of segments 44 corresponding to the number of different kinds of beverages to be dispensed. A selecting arm 46 extends from a knob 48 rotatably mounted on a pin 50 on the face of door 14 and is adapted to be moved to contact any one of the segments 44 to complete the proper electrical circuits, to be described hereinafter, to set the machine for dispensing the selected beverage. A "hot" button 52 is provided for initiating the dispensing operation when a hot beverage has been selected, and a "cold" button 54 for initiating the dispensing operation when a cold beverage has been selected.

I arrange a hot water tank 56 having legs 58 within the housing on the platform 24. A suitable heating element 60 and thermostatic switch 62, connected in series, are provided within tank 56 to heat the water. Leads 64 and 66 connect element 60 and switch 62 to a suitable source of electric energy, indicated by reference numeral 213 in Figure 6. Tank 56 is supplied with water through a pipe 68 from a source of water pressure, such as the city water mains, for example. I mount a number of bottles 70 containing the liquids to be mixed with the hot water to make up the beverages to be dispensed on brackets 72 attached to wall 22 near the top of housing 10 by any appropriate means such as bolts 74. Guide brackets 76 fixed on wall 22 by means such as bolts 78 retain the bottles in position on brackets 72. Additional brackets 82 attached to the left-hand side of housing 10, as viewed in Figure 2, by bolts 84 and held in position by guide brackets 86 attached to the side by bolts 88. It is to be noted that bottles 70 and 80 are inverted and disposed with their necks in holes provided in brackets 72 and 82, respectively.

Each of the bottles 70 and 80 is connected by a short piece of flexible tubing 90 to the inlet tube 92 of a constant head supply reservoir indicated generally by the reference character 94. Reservoirs for bottles 70 and 80 are mounted, respectively, on wall 22 and the left-hand side of housing 10 as seen in Figure 2. The outlet 95 of each of the reservoirs 94 is connected to the cylinder 96 of a valve, generally indicated by the reference numeral 98, by a length of flexible tubing 100. The outlet 102 at the top of hot water tank 56 is also connected to a valve 98 by tubing 104. The lengths of tubing 90, 100, and 104 may be made of any suitable flexible material such as plastic or the like. Each of the valves 98 extends into a mixing channel 106, the outlet 108 of which is, in turn, connected to the dispensing outlet 110 by tube 112. Dispensing outlet 110 leads into the compartment 18 to deliver the beverage dispensed to the cup. Mixing channel 106 is secured to a housing 114 by suitable means such as screws 107 and is provided with a cover 109.

The housing 114 rests on a platform 116 and is held thereon by suitable means such as screws 118. Platform 116 is attached to wall 22 by screws 120. I provide a number of solenoids 122 corresponding to the number of valves to be actuated and mount them within the housing 114 by suitable means such as rivets 124. As can be seen in Figure 4, each of the valves 98 has a tubular body 96 and a stopper or plug, indicated generally by reference numeral 128, including a tapered nose 130 and a shank 132. A sealing ring 134 made of suitable material such as rubber or the like is mounted on shank 132 behind the nose 130. Stopper 128 is fixed to a lateral extension 136 of a vertical link 138 by means of a screw 140 threaded into the shank 132. A spacer 142 is disposed on shank 132 between the lateral extension 136 and sealing ring 134 to hold ring 134 firmly against the base of nose 130. Ring 134 is of such a size as to form a liquid-tight seal with the seat 144 of the valve body 96.

I provide a number of valves corresponding to the number of different liquids to be dispensed and mount the bodies 96 in holes 146 formed in flanges 148 extending outwardly from bracket 150 secured to housing 114 by suitable means such as screws 152. The lower ends of bodies 96 extend through openings 154 formed in the cover 109 of mixing channel 106. Each of the bodies 96 may be moved up or down in holes 146 and opening 154 and secured in any position by tightening set screws 158. Links 138 extend upwardly through openings 160 in cover 109 and through holes 162 in flanges 148 and carry pins 164 adjacent their upper ends. Levers 166 are pivotally mounted on pins 168 carried by angle brackets 170 attached to housing 114 by means such as screws 172. One end of each of the levers 166 extends through a slot 174 formed in the wall of housing 114 and is connected to link 138 by pin 164. I connect the other end of each of the levers 166 to the armature 176 of one of the solenoids 122 by a pin 178 in a bracket 180 on the end of armature 176. When solenoids 122 are de-energized, armatures 176 are held out of the solenoids by springs 182 connected at one end to pin 178 and at the other end to an angle iron 184 fixed to the base of housing 114 by screws 186. When armatures 176 are in this position, the stoppers 128 are held firmly against seats 144 through lever 166 and link 138 to prevent the escape of liquid into channel 106. It is to be understood that I may arrange my valves so that stoppers 128 are fixed and the valve bodies 96 are movable relative thereto. It will be noted that in my construction there is a minimum of liquid concentrate-wetted area exposed to air.

I provide a plurality of cams mounted on the shaft 190 of a motor 192 to complete the circuits of selected solenoids to actuate respective valves 98. In the embodiment illustrated I have provided a hot water cam 194, a chocolate syrup dispensing cam 196, a coffee concentrate cam 198, a cream cam 200 and a sugar cam 202, as is readily seen by reference to Figures 6 and 7. The solenoids to be energized are selected by moving arm 46 to any one of the segments 44. The resulting electrical connections are shown in Figure 6. A number of contacts 204 corresponding to the number of hot beverages to be dispensed are arranged in segments 44 of selector 42 so that when selecting arm 46 is moved to one of the segments 44, it will engage the associated contact 204. Concentric conducting arcs 206 are arranged in the selector 42. I connect each arc 206 in the circuit of a solenoid 122 corresponding to one of the liquids to be mixed with the hot water. Conducting bars 208, 209, 210, 211 and 212 connect certain of the arcs 206 so that the circuits of the respective solenoids 122 are connected in parallel across a source of electrical energy 213 when the contact 204 corresponding to one of the bars is engaged by selecting arm 46 and the coin register circuit and switch 52 are closed. For example, link 210 connects the center contact 204 with the arcs 206 corresponding to the solenoids for actuating both the coffee concentrate and cream valves. In the embodiment illustrated, the remaining bars 208, 209, 211 and 212 link their respective contacts 204 with selected ones of the arcs 206 so that hot chocolate, black coffee, coffee with sugar, coffee with cream and coffee with cream and sugar may be selectively dispensed, depending on the position of arm 46. It will be appreciated that the solenoid corresponding to the water valve is always in parallel with the selected solenoids, since all beverages require hot water.

When the selection has been made, the operator pushes button 52 to complete the circuit of motor 192 across the source of electrical energy 213, and the motor rotates. This circuit would be broken, however, immediately upon the release of button 52. To obviate this possibility, I have provided a circuit holding cam 214 on shaft 190. When the motor begins to rotate, the cam 214 moves its follower 216 which, through linkage 218, closes a switch 220 connected across switch 52. The contour of cam 214 is such that switch 220 will be kept closed until the armature of motor 192 has made one complete rotation thus holding the motor circuit during one cycle of operation.

Cams 194 to 202 have followers 222 arranged to actuate, respectively, switches 224, 226, 228, 230 and 232 through suitable mechanical linkages 234. Switches 224 to 232, when closed, complete the circuits of selected solenoids 122. The contours of cams 194 to 202 are such that water will be mixed with the selected liquids in exactly the proper proportion.

I provide each of the constant head reservoirs 94 with means for indicating when the particular supply of liquid is exhausted. As is shown in Figure 5, floats 236 rest on the surface of the liquid in the reservoir and have rods 242 attached thereto which extend upwardly through openings 238 in the covers 240 of the reservoirs 94. The upper ends of rods 242 are connected to levers 244 by pins 246. Levers 244 are carried by pivot pins 248 on microswitches 250 fixed to wall 22 by suitable means such as screws 252. The ends 254 of levers 244 are arranged to engage the "open" and "close" contacts 256 and 258, respectively, of microswitches 250. As long as a supply of liquid remains, the level of liquid in reservoir 94 will maintain float 236 in a raised position so that the end 254 of lever 244 will engage contact 256 to keep the microswitch open. When the supply of liquids is depleted, the level of liquid in reservoir 94 will drop, thus lowering float 236 and moving lever 244 to the dotted line position shown in Figure 5 so that end 254 will engage contact 258 to close the switch. As indicated in the schematic view in Figure 8, each of the microswitches 250, when closed, will connect a number of electric lamps 260 across a source of electrical energy 262. These "empty" signal lamps 260 are arranged under translucent windows in panel 40. Depending on which of the various liquids is exhausted, certain of the lamps will be lighted to indicate that the machine is no longer capable of supplying a particular beverage. For example, if the supply of coffee concentrate is exhausted, a lamp will be lighted under each of the four windows corresponding to the four coffee selections possible.

Our machine may also be arranged to dispense any number of cold beverages, in which case the button 54 is pushed when coins have been deposited in slot 28 and the beverage selected. To keep the cold beverages cold I arrange refrigerating coils 264 on platform 24 and provide a pump and motor 266 for circulating the refrigerant. The motor 268 of the pump and motor combination is connected in series with a thermostatic switch 270 across source 212, as can readily be seen by reference to Figure 6. It is to be noted that motor 268 and switch 270 are connected in parallel with heating element 60 and switch 62. Suitable insulating material insulates hot water tank 56 from the surrounding cold area. Coils 264 also keep the liquids to be mixed with the hot water cold to prevent spoiling.

In use, the customer first turns knob 48 to a segment 44 corresponding to the desired beverage. He then inserts the required amount in coins in slot 28. If he has selected a hot beverage, he pushes button 52 to initiate the dispensing cycle or, if he has selected a cold drink, he pushes button 54. In the event that the supply of the selected beverage is exhausted, he may depress lever 32, and the coin will be returned. Assuming he has selected, for example, coffee with cream but no sugar, he rotates knob 48 and selecting arm 46 to a position clearly labeled where arm 46 engages a contact 204 on the conducting bar 210 which connects the cream and coffee concentrate solenoids in the circuit. Appropriate coins are inserted in coin register 26. Button 52 is depressed to complete the circuit of motor 192. The shaft 190 of motor 192 rotates in a clockwise direction as viewed in Figure 7. It immediately displaces follower 216 to close switch 220 to maintain the motor circuit closed during one revolution of shaft 190. Shortly thereafter, cam 194 moves its follower 222 to close switch 224 which actuates the valve 98 controlling the supply of hot water from tank 56. The solenoid 122 corresponding to the hot water valve is energized and its armature 176 is drawn into the solenoid to rotate lever 166 in a counterclockwise direction as viewed in Figure 4 about pivot 168 and move link 138 down to withdraw stopper 128 from the valve body 96. Hot water will flow by gravity out of the valve through spout 188 into channel 106. A short time thereafter, that is, the time it takes shaft 190 to rotate through arc "a," indicated in Figure 7, the coffee concentrate cam 198 will move its follower 222 to close the switch 228 associated with the coffee valve 98 through linkage 234. This opens the coffee valve and allows coffee concentrate to flow into mixing channel 106. When the shaft 190 has rotated through a further arc "b," the cream cam 200 closes its associated switch 230 and actuates the cream valve to dispense cream into mixing channel 106. The cream switch 230 is kept closed for only a short time by cam 200 as can be seen from the contour of cam 200 shown in Figure 7. When a point on coffee cam 198, indicated by reference character A in Figure 7, reaches follower 222, the supply of coffee concentrate will be cut off. That is, switch 228 will open, breaking the coffee solenoid circuit, so that spring 182 will rotate lever 166 clockwise as seen in Figure 4 about pivot 168 to seat stopper 128 in valve body 96 and cut off the supply of coffee concentrate. At a time thereafter, corresponding to the arc "a," the supply of hot water will be cut off. However, during that time hot water will continue to flow in channel 106. We select the dimensions of channel 106 such that during the flow of hot water in the channel, the level of water therein will be above the valve opening in body 96. As a result, any of the liquid dispensed through the valves which might otherwise cling to the surfaces of the exposed valve parts or to the channel 106 itself is washed down the channel into the outlet 108 and tube 112 into the cup. This ensures that no deposits of liquid are left on parts of the machine which are exposed to the air. When a revolution of shaft 190 is completed, follower 216 of cam 214 will move back into its recess and open switch 220 through linkage 218 to break the motor circuit.

During the revolution of shaft 190, cams 196 and 202, the chocolate syrup and sugar syrup cams, have actuated their respective followers to close switches 226 and 232. The solenoids corresponding to these switches are not, however, energized, since the link 210 corresponding to the selected beverage does not connect the corresponding arcs 206 into the circuit through arm 46. Of course, the hot water solenoid will always be actuated or energized, since each of the beverages requires hot water. The remaining solenoids are connected in the circuit only when the corresponding liquid is necessary to make up the beverage to be dispensed. In the event that the supply of any one of the liquids is exhausted, the appropriate "empty" signal lamp will be lighted to indicate this fact to the customer.

In every case, no matter what hot beverage is selected, hot water will flow into channel 106 for a short period before and a short period after the other liquids are released into the channel. Therefore, no gummy deposits can result. The water flowing during these periods is not waste but actually forms part of the beverage. The contours of cams 194 to 202 is selected so that exactly the proper proportion of water and other liquid is mixed. The constant head supply reservoirs ensure that the head of liquid on each of the valves is constant until such time as the liquid supply is exhausted and, therefore, ensure that a constant amount of liquid will be released from any selected valve in each operation of the machine.

Thus it will be seen that I have accomplished the objects of my invention in providing an improved beverage merchandising machine in which no gummy deposits of liquid are permitted to form on parts exposed to the air. In addition, I have provided an improved dispensing valve structure and constant head supply therefor to ensure that on each operation each valve will deliver the same amount of liquid. Furthermore, my improved beverage merchandising machine will selectively dispense any one of a number of hot beverages, and the arrangement is such that the strength of the beverage is accurately controlled. Means are arranged on the machine to indicate that the supply of any particular beverage is exhausted.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. In a beverage merchandising machine for dispensing a beverage made of hot water and selected liquids, a hot water valve having a normally closed opening, a plurality of liquid supply valves having respective normally closed openings, a mixing channel, said hot water valve and said liquid supply valves being adapted to be operated to deliver hot water and the selected liquids to said channel, and means mounting said valves with respect to said channel whereby the level of hot water in said channel covers said normally closed openings during the period of operation of said hot water valves.

2. A beverage merchandising machine including in combination a housing, a hot water tank mounted in said housing, a plurality of constant head liquid reservoirs, a valve associated with said tank, a plurality of valves associated with said reservoirs respectively, a mixing channel supplied from said valves, automatic means for sequentially opening said tank valve and selected ones of said liquid reservoir valves to obtain the mixture constituting the beverage to be dispensed, means for selecting the reservoir valves to be opened and empty signal means associated with each of said liquid reservoirs.

3. In a beverage merchandising machine having a reservoir from which liquid is to be dispensed a valve including a body having open ends, means connecting one end of said body to said reservoir to provide a normally open passage for admitting liquid into said body normally to fill the body with liquid, a sealing plug cooperating with the other end of said body normally to prevent the escape of liquid from the other end of said body, said plug in its normal position being in contact with the fluid in said body and means mounting said plug and said body for relative movement away from each other to permit fluid in said body to escape through said other end to dispense liquid by gravity when the valve is actuated.

4. In a beverage merchandising machine having a reservoir from which liquid is to be dispensed a valve including an upright body portion with a seat formed on its lower end, means providing communication between the upper end of said body portion and said rservoir to provide a normally open passage for admitting liquid into said body normally to fill said body with liquid, a stopper cooperating with said seat normally to prevent the escape of liquid from said body portion said hopper in its normal position being in contact with the fluid in said body, and means for moving said stopper and said body portion relative to each other to permit said liquid normally in said body to flow out of the body to dispense liquid from said body portion by gravity.

5. A valve as in claim 4 including a sealing ring on said stopper for cooperation with said seat to form a liquid-tight seal.

References Cited in the file of this patent

UNITED STATES PATENTS

| | | |
|---|---|---|
| 1,979,323 | Felesina et al. | Nov. 6, 1934 |
| 2,415,571 | Yuza | Feb. 11, 1947 |
| 2,462,019 | Bowman | Feb. 15, 1949 |
| 2,565,084 | Parks | Aug. 21, 1951 |
| 2,569,486 | Mills | Oct. 2, 1951 |
| 2,614,738 | Mills | Oct. 21, 1952 |
| 2,617,510 | Little | Nov. 11, 1952 |
| 2,712,887 | King | July 12, 1955 |
| 2,746,641 | King | May 22, 1956 |
| 2,764,385 | Sieling | Sept. 25, 1956 |